United States Patent
Ciuti et al.

[15] 3,676,357
[45] July 11, 1972

[54] COMPOSITIONS USEFUL FOR ELIMINATING WATER SURFACE POLLUTION CAUSED BY ORGANIC SUBSTANCES

[72] Inventors: Brunello Ciuti, San Donato Milanese; Sergio Del Ross, La Spezia, both of Italy

[73] Assignee: Snam Progetti S.p.A., Milan, Italy

[22] Filed: March 6, 1970

[21] Appl. No.: 17,334

[30] Foreign Application Priority Data

March 6, 1969 Italy...................................13723 A/69

[52] U.S. Cl. ......................252/259.5, 210/36, 210/DIG. 21, 252/115, 252/179, 252/323
[51] Int. Cl. .......................................B01d 15/00, C09k 3/00
[58] Field of Search ......................252/259.5, 115, 179, 323; 210/36

[56] References Cited

UNITED STATES PATENTS

| | | | |
|---|---|---|---|
| 2,162,023 | 6/1939 | Miller et al.........................| 252/115 X |
| 2,464,204 | 3/1949 | Baker.....................................| 210/36 |

*Primary Examiner*—Richard D. Lovering
*Attorney*—Ralph M. Watson

[57] ABSTRACT

Composition useful in eliminating surface water pollution caused by crude petroleum oil or its fractions consisting of:
1. a carrier having a specific gravity sufficiently low that it floats (e.g. sawdust, silicates, diatomite, vegetable oil residues, vegetable flour, animal flour, silica gel, charcoal, polyurethane resin and polyvinyl chloride);
2. a surface active agent, viz., sodium stearate, sodium alkyl-sulfonate, potassium stearate, sodium dodecyl-benzene-sulfonate, potassium palmitate, nonylphenol ethylene oxide (1:7) or triethanolamine oleate; and
3. a wetting agent, viz., isoamyl alcohol, glycerol, ethylene glycol, butylic alcohol or amyl alcohol.

2 Claims, No Drawings

COMPOSITIONS USEFUL FOR ELIMINATING WATER SURFACE POLLUTION CAUSED BY ORGANIC SUBSTANCES

This invention relates to a new type of composition useful as a means for eliminating the surface pollution of water like soft waters and brackish waters said pollution being caused by organic substances like petroleum products or similar organic substances either of synthetical or of natural origin.

It is known that the water pollution both of the sea and of the rivers, of the lakes, of the waterways, of the big basins, which are often entrusted with very important functions like irrigation, is getting day by day a very serious problem. The industrialization increase causes generally an increase of the water requirement and the consequent increase of the necessity to drain the waste waters downstreams of the industrial zones.

The pollutants more diffused are generally the detergents, soluble salts and liquid products not miscibles with water constituted generally by oily substances of petroleum nature.

The purpose of this invention is the elimination of the surface pollution both of the fresh water and of the sea water comprising losses either of crude oil or of its fractions (as above mentioned).

The problem concerns mainly sea, those rivers and lakes where water crafts, used for the transport both of the crude oil and of its derivatives operate, but there are included those water-courses and sheets of water wherein there are pipelines placed on the surface or underground. In effect with continuous losses coming from the pipelines joints or even in the case of a pipeline breakage there is the possibility that on the surfaces appear zones polluted by petroleum both as a thin film of a molecular thickness and as large spots few millimeters thick.

Also in the ports generally, diffused laminar layers, due to a big number of causes like losses of shipment, cooling water a.s.o., float, without counting the frequent cases of more serious pollutions due either to a breakage or to the disjoining of the loading hoses a.s.o.

The present and future damages of these pollutions are incalculable also for the fact that the pollution is subjected to be translated very far from the place where it came into contact with the water, owing to the winds and to the streams. In such a way the waters and the coasts of great tourist interest are permanently threatened even if far from the polluted zones.

Moreover the presence of pollutants of oil origin damages the normal development of the flora and of the fauna and produces in the best case pollutions which make scarcely eatable fishes and edible mussels, which live in polluted zones.

The problem of the water pollution has become, mainly in the last 10 years more and more critical with the increase of petroleum and its derivatives transportations by means of tankers and pipelines.

To these pollutions must be added the incidental ones occurring to the tankers as such. These serious drawbacks which are continuously repeating induced the organizations entrusted with the cleaning of the ports, the coast zones and the fresh waters, to establish a series of standards useful to guarantee the state of said waters and to eliminate the pollutions when they occur. For water surfaces circumscribed, enclosed, delimited, where possible pollutions must be eliminated by actually removing the pollutants, special crafts sucking the polluting liquid from the water surface have been essayed with a certain success.

In the case of serious pollutions mainly in the sea where the expanse of the place causes unconditioned spreadings of the pollutant with formation of very thin laminar layers, the recovery with these special crafts should be very difficult and expensive.

It is known that in such occasions anti-pollution means are used, some of which are officially prescribed as equipment of the ports and of the tankers. These anti-pollution means according to the action they may develop, are divided into three great groups.

1. Substances acting like solvents and dispersants consisting of liquids which distributed in the polluted zones make emulsifiable, at least partially, the oil products with water. The streams and the wave-motion provide thereafter to disperse the pollution by diluting it in vaster surfaces and lowering then the concentration down to negligible values.

2. Absorbing substances with an high specific gravity, as powder or granules which are distributed directly on the polluted surfaces. These powders absorb he pollutant forming agglomerates which go to deposit on the bottom. In such a way at least the surface is looking clean.

3. Floating absorbing substances with a low specific gravity as powder or granules which are distributed on the large spots of pollutant with which they form agglomerates of absorption having a great volume, and which may be recovered by a mechanical means.

There is no doubt that the use of one of said means either recovering craft or one of the three types of the above mentioned substances has bettered the situation of the polluted zones.

But it is clear enough that the use of recovery crafts or of the absorbing substances determines more satisfactory results permitting an effective removal of the pollutant from the polluted zone.

The other solvent-dispersant type and the absorbing type, which takes the pollutant to the bottom, cause only a transfer of the pollution; in the first case as a matter of fact of dispersion of it in a greater volume of water occurs, in the second case there is only a sinking of the pollutant. Hereinafter we list some of the main defects and considerations on the use of said systems.

1. Sweeper - recovery crafts. They must run along many times the whole zone polluted by sucking much water chiefly when the pollution is constituted by very thin films. On the other hand for pollutions of bigger thickness the sweeper craft must be helped by a tanker.

2. Solvent - dispersant liquids. The same solvents which these products are constituted by mostly are to be considered themselves pollutants or at least may not be innocuous for the flora and the fauna. In the long run, with recurring pollutions the amounts of general water pollution are increasing. The cost of these products is generally limited but often not sufficiently for what concerns the percentages of use required.

3. Absorbing substances having a high specific gravity. They present the advantage to be constituted mostly by inert material, but there are some products activated by means of substances not completely innocuous. The more serious inconvenience of this type of products derives from the fact that in the long run a part of the absorbed product is released by the absorbent and goes back to the surface. The amounts of substance to be employed for eliminating completely the pollutant are remarkable and consequently the costs of elimination of the large pollutions are extremely high.

4. Absorbing substances having a low specific gravity. They appear to be the means more efficient till now known because when they have absorbed the petroleum products, the spongy agglomerate which forms may be recovered and removed.

For a good systematic cleaning of a certain zone a remarkable amount of substance is needed and costs are then high enough.

The recovery of large amounts of inhibited material involves the use of suitable crafts. After all of the four known methods for cleaning the water from the pollution of petroleum or oily nature in general the first and the fourth one are to be considered to have a positive effect since they effectively remove the pollutants. The second and the third one leave much to be desired for he limitations in the effect due to their particular running mechanism.

The purpose of the searches we carried out in the field of the substances suitable for cleaning the water surfaces has been the one to look for a substance having a natural activity characterized at the same time by a low cost and suitable to remove or to make easy the removing of the amounts of pollutants from the water surfaces.

An object of this invention is then a substance either in the state of powder or in the state of granules which distributed in the surrounding zones or in the ones adjacent to the zones polluted produces the following effects:

1. The contraction of the polluting large spots or their transfer to a single zone of accumulation with such a thickness to make more economical and easier the recovery by means of the systems already known. A particular advantage of the use of the new composition is constituted by the fact that the recovery may be made through mechanical means so that the pollutant may be reutilized without further treatments.
2. By choosing suitably the constituents it is possible to obtain compositions whose origin doesn't present noxious characteristics towards the flora and the fauna.

More particularly the new composition tends to shift the polluting liquids on the water surfaces and if its distribution is carried out in a suitable way all about the polluted zone, the contraction of polluted surfaces causes the concentration of the pollutant, wherefor its recovery by means of special crafts or absorbents results more rapid, more complete and economically more advantageous. Then the new composition must be considered as an antipollutant of the water surfaces because it gets free completely the same surfaces on which it is spread and may be considered also as an auxiliary mean of the already known systems for recovering and removing the pollutant.

With the purpose of a better understanding of the new means that we have found, hereinafter we exemplify an experiment carried out in our laboratory and which has recently been repeated on a real scale, both on sea water surfaces and on lake surfaces. The polluted surfaces of a basin were measured before and after the use of the new anti-pollutant composition and it was observed that laminar pollutions, about 0.03 mm thick, concentrate so as to be 3 mm thick. Then in this case the polluted surface was reduced about 100 times.

The new composition of the invention comprises substantially:

| a) | low specific gravity carrier | 10–90% |
|---|---|---|
| b) | surface active agent | 9–80% |
| c) | wetting agent | 1–10% |

The low specific gravity carrier may be constituted by sawdust, light silicates as vermiculite, talc, some bentonite a.s.o. diatomite, vegetal oil production residues, vegetal and animal flours, residues of the cereals grinding and of the flours therefrom derived, expanded resins as granules and as powder, silica-gel, animal and wood coal, animal charcoal a.s.o. The low specific gravity of the carrier derives from the necessity that the composition acts on the water surfaces and therefore it must float.

The surface active agents may be constituted by the following products or by mixtures thereof: namely conventional soaps of the alkaline metals (oleates, palmitates, stearates of sodium and potassium) ricinoleates sulforicinoleates, cationic and anionic surfactants, sulfonates, sulfocyanates, sulfonaftenates. The wetting agent may be constituted by alcohol having a low and an high molecular weight, glycerol, glycol, polyglycol, preferably with high molecular weight. The new composition is generally powdery but in some cases it is provided the mixing of the components, the following dessiccation of the mixture and its grinding till obtain granules of well defined size. The composition and the size of the granules influence, as it is possible to foresee, the practical behavior of the products, their variations allow to obviate some drawbacks which may verify in relation to the salt content and to the water temperature of the external ambient. The efficiency of the composition depends upon the suitable selection and the combination of the different components.

A carrier particularly light if it is very subdivided may be more active but needs a wetting means stronger to obtain immediately the necessary contact with water wherewith the spreading of the surfactant is connected.

A surfactant, very available by the economical point of view but deficient with respects to its functionality if mixed with another surfactants may be sensitized to this functionality. The mechanism of action of the new composition is rather complex.

Without analyzing such mechanism since this invention intend to be bound to any particular mechanism, it may be supposed that the phenomenon on which is based said mechanism is the one of the lowering of the surface tension with a consequent motion of the surface layers of the water itself. The surface motion derived therefrom is transmitted to the floating layers of any type of substance whether solid or liquid.

At the same time the low specific gravity carrier migration is noted.

Tests carried out in absence of the carrier gave no satisfactory result, and this has shown a certain determining interaction of the same carrier with the other components.

The following examples have the purpose of better illustrating compositions useful to clear the water surfaces from pollutants according to our inventions not intending in any way to limit the invention to what is reported thereinafter.

The variations in the quality and in the quantity of the ingredients utilized for said compositions are necessary according to the type of water to be cleaned, to its temperature, to the external temperature and to the pollution type a.s.o. It is obvious that in the selection of said ingredients the economical factor is very important mainly in the cases of vast polluted surfaces.

EXAMPLE I

A mixture having the following composition was prepared:

| Fenolite (Trade Mark) (powder) | =60% |
|---|---|
| Sodium stearate | =35% |
| Isoamyl alcohol | =5% |

The composition was obtained by mixing the fenolite and the stearate in a stirrer with blades revolving in opposite motion. After obtaining a complete homogeneization, to a tenth of the product is added separately the isoamylic alcohol by mixing, then the whole has been gathered and thoroughly homogeneized. The composition was used for cleaning fresh water surfaces polluted with mineral oils.

EXAMPLE 2

With the same way of acting of the Example 1 was prepared a product having the following composition:

| Polyurethane resine (powder) | =55% |
|---|---|
| Sodium stearate | =30% |
| Sodium alkylsulphonate | =5% |
| Glycerol | =10% |

The product was employed for cleaning sea water polluted with fuel oil of high specific gravity.

EXAMPLE 3

With the same way of acting of Example 1 a product having the following composition was prepared:

| Foam glass | =70% |
|---|---|
| Potassium stearate | =27% |
| Ethylenic glycol | =3% |

The product was used for cleaning fresh water having an abundant pollution of light petroleum products.

EXAMPLE 4

With the same process of Example 1 a product having the following composition was prepared:

| | |
|---|---|
| PVC (polyvinylchloride) (in granules) | =20% |
| Polystyrol (powder) | =40% |
| Potassium stearate | =30% |
| Hexylene glycol | =10% |

The product was employed for treating sea water when polluted by gasoil or other light fractions of petroleum.

EXAMPLE 5

With the same process of Example 1 a product having the following composition was prepared:

| | |
|---|---|
| Wood dust | =60% |
| Sodium stearate | =30% |
| Potassium dodecylbenzene sulfonate | =5% |
| Cyclohexanol | =2% |
| Decalin decahydronaphthalene | =3% |

The composition was employed for removing crude oil from fresh water.

EXAMPLE 6

With the same process of the Example 1 a product having the following composition was prepared:

| | |
|---|---|
| Degreasing cake obtained from peanuts seeds working | =80% |
| Sodium stearate | =18% |
| Hexylene glycol | =2% |

The composition very cheap was employed for removing pollutions very vast and abundant of petroleum products and the like.

EXAMPLE 7

With the same process of the Example 1 a product having the following composition was prepared:

| | |
|---|---|
| Aerosil (Trade Mark) not compressed | =70% |
| Sodium stearate | =25% |
| Sodium dodecylbenzensulfonate | =3% |
| Octylic alcohol | =2% |

The composition was employed for removing a very thin film of pollution of petroleum products and the like.

EXAMPLE 8

With the same process of Example 1 a product having the following composition was prepared:

| | |
|---|---|
| Residues of the sieving of vegetal flours | =70% |
| Potassium palmitate | =25% |
| Octylic alcohol | =5% |

The product was employed for cleaning polluted brackish water from very thin layers of heavy and light petroleum products.

EXAMPLE 9

With the same process of the Example 1 a product having the following composition was prepared:

| | |
|---|---|
| Charcoal powder | =30% |
| Sodium sulforicinoleate | =15% |
| Surfactant nonylphenol/ethylene oxide (1:7 ratio) | =3% |
| Butylic alcohol | =2% |

The product was employed for cleaning fresh and brackish waters having a high pollution percentage.

EXAMPLE 10

With the same process of the Example 1 a product having the following composition was prepared:

| | |
|---|---|
| By-products (as powder) of the rise working | =70% |
| Sodium stearate | =25% |
| Sodium dodecyl benzene sulfonate | =4% |
| Ethylene glycol | =1% |

The product was employed both in fresh water and in brackish water for pollution with petroleum products and the like.

EXAMPLE 11

With the same process of Example 1 a product having the following composition was prepared:

| | |
|---|---|
| Very thin powder of talc | =30% |
| Fish powder | =30% |
| Sodium oleate | =30% |
| Glycerol | =10% |

The product pasted, dried and milled was employed in fresh and brackish water polluted with petroleum products and the like.

EXAMPLE 12

With the same process of the Example 1 a product having the following composition was prepared:

| | |
|---|---|
| Milled and sieved vermiculite | =70% |
| Triethanolamine oleate | =25% |
| Sodium dodecylbenzene sulfonate | =4% |
| Amyl alcohol | =1% |

The product was employed for cleaning fresh water polluted with petroleum products and the like.

We claim:

1. Composition suitable for cleaning water from pollutions caused by crude petroleum oil or its fractions consisting of from 10–90percent of a carrier having a specific gravity sufficiently low that it floats; from 9–80percent of a surface active agent selected from the group consisting of sodium stearate, sodium alkylsulfonate, potassium stearate, sodium dodecylbenzene sulfonate, potassium palmitate, nonylphenol/ethylene oxide (1:7) and triethanolamine oleate; and from 1–10percent of a wetting agent selected from the group consisting of isoamyl alcohol, glycerol, ethylene glycol, butylic alcohol and amyl alcohol.

2. Composition according to claim 1 wherein said carrier is selected from the group consisting of sawdust, silicates, diatomite, vegetable oil residues, vegetable flour, animal flour, silica gel, charcoal, polyurethane resin and polyvinyl chloride.

* * * * *